United States Patent [19]

Ross

[11] 4,279,174
[45] Jul. 21, 1981

[54] SINGLE LEVER 10-SPEED BICYCLE SHIFTER

[75] Inventor: Haldon Ross, Olney, Ill.

[73] Assignee: AMF Incorporated, White Plains, N.Y.

[21] Appl. No.: 8,908

[22] Filed: Feb. 2, 1979

[51] Int. Cl.³ .................... B62M 9/00; F16H 7/22
[52] U.S. Cl. ................................ 74/473 P; 74/475; 74/489; 280/238
[58] Field of Search ............ 74/217 B, 217 C, 217 S, 74/242, 473 R, 473 P, 475, 489, 501 R, 551.1, 551.8; 116/28.1; 280/236, 238, 261

[56] References Cited

U.S. PATENT DOCUMENTS

| | | | |
|---|---|---|---|
| 561,145 | 6/1896 | Tullius | 74/217 B |
| 614,969 | 11/1898 | Murphy et al. | 280/238 |
| 2,587,454 | 2/1952 | Fletcher et al. | 74/501 X |
| 3,524,979 | 8/1970 | Cohen | 116/28.1 X |
| 3,901,095 | 8/1975 | Wechsler | 74/217 B |
| 3,965,763 | 6/1976 | Wechsler | 280/236 X |
| 4,055,093 | 10/1977 | Ross | 74/475 X |
| 4,132,119 | 1/1979 | Nagano et al. | 74/217 B |
| 4,171,824 | 10/1979 | Foster | 74/594.6 X |

FOREIGN PATENT DOCUMENTS

| | | | |
|---|---|---|---|
| 19997 | 7/1899 | Switzerland | 280/238 |
| 518 | of 1882 | United Kingdom | 280/238 |

Primary Examiner—Lawrence J. Staab
Attorney, Agent, or Firm—George W. Price; Walter Lewis

[57] ABSTRACT

The shift mechanism is incorporated into the handlebar stem which goes into the front fork stem.

2 Claims, 8 Drawing Figures

SINGLE LEVER 10-SPEED BICYCLE SHIFTER

This invention relates to an improved single lever 10-speed bicycle shifter, and more particularly, to improvements in the type of single knob or lever 10-speed bicycle shifting mechanism disclosed in my U.S. Pat. No. 4,055,093 granted Oct. 25, 1977, and assigned to the same assignee as the instant application.

Briefly, in the invention, the shift mechanism is incorporated into the handlebar stem, a positive push-pull type cam mechanism is provided for actuating the rear derailleur, undershift and overshift is prevented to eliminate chain "jump off", and the device can be shifted with the bicycle standing still.

The above and other features and advantages of the invention will be best understood by considering the following detailed description taken in connection with the attached six sheets of patent drawings in which.

Figure 1:
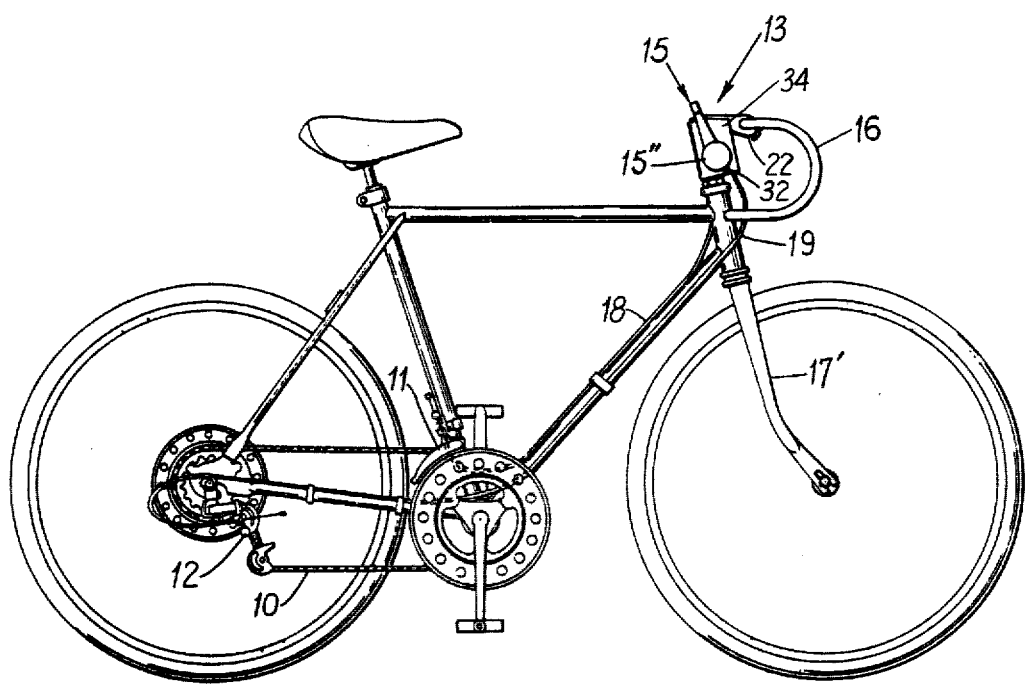
FIG. 1 is a side view of a 10-speed bicycle incorporating the invention.
Figure 2:
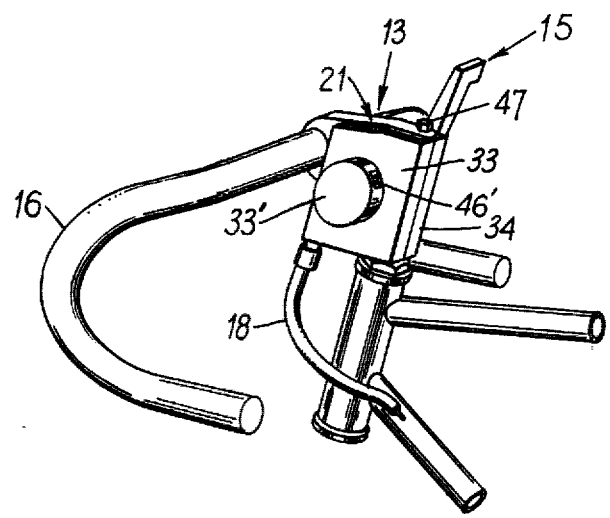
FIG. 2 is an enlarged view of the far side of the front end of the bicycle shown in FIG. 1.

Referring now to the drawings, shown in FIG. 1 is a 10-speed bicycle. As is conventional, two not shown sprocket wheels are provided at the pedal hub, and five at the rear wheel, with a sprocket chain 10 extending therebetween. Front and rear derailleur mechanisms 11, 12 are provided adjacent each set of sprockets to shift the front and rear ends of the chain at the proper time between the sprockets of the front and rear sets of sprockets.

Figure 4:
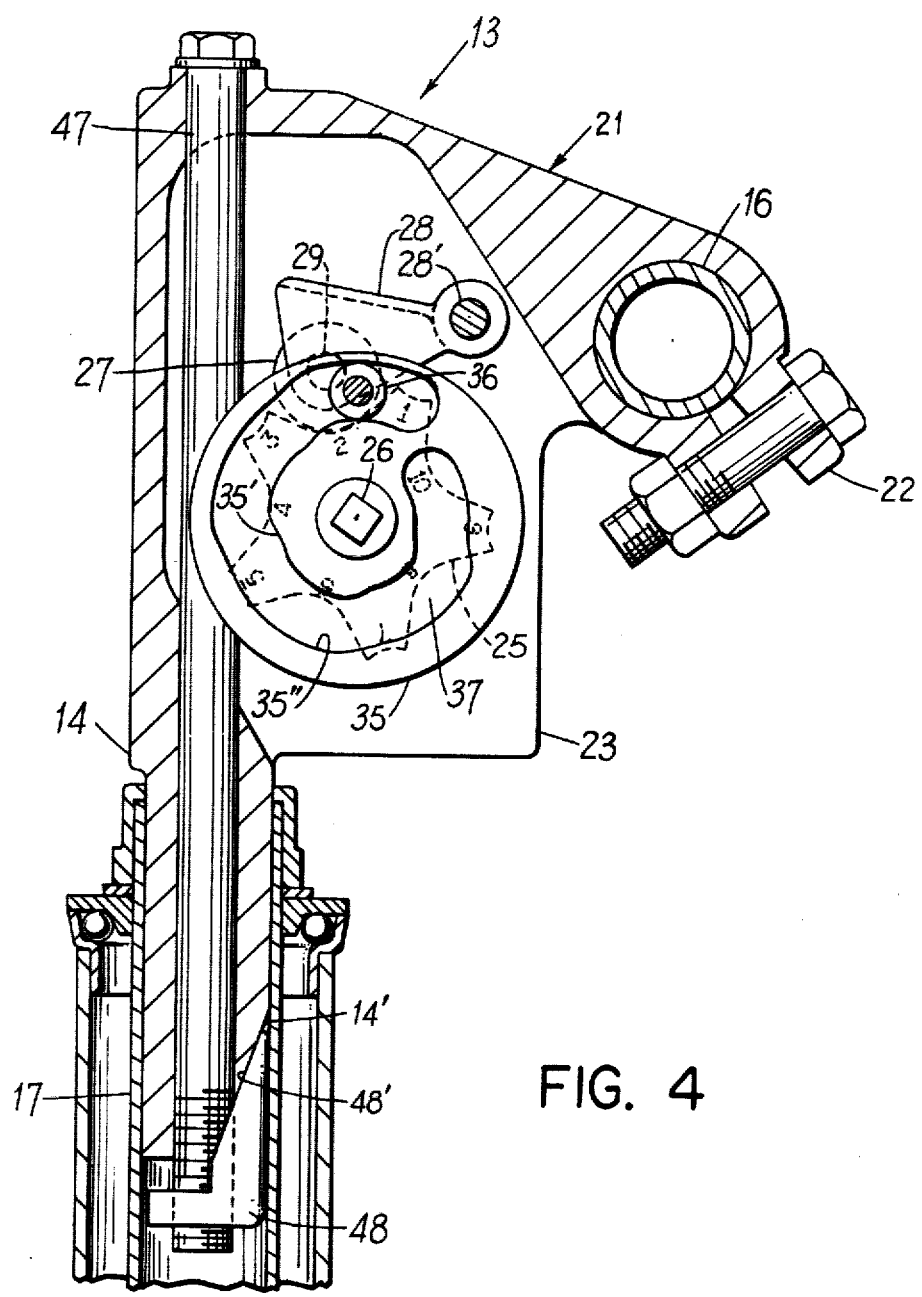
FIG. 4 is a further broken away view similar to that of FIG. 3 to show some of the internal parts.

The derailleur mechanisms are operated through a 10-speed shifter mechanism 13 mounted in the handlebar stem 14, see FIG. 4. Briefly, a single two-way ratchet lever 15 covers all ten speeds of the bicycle. That is to say, it operates both derailleur mechanisms. By moving the ratchet lever 15 forwardly, the bicycle is sequentially shifted through shift stages 1–10. By ratcheting it rearwardly, the shift is from 10–1. It does this by virtue of the shift mechanism inside the handlebar stem 14, which, of course, is the stem that provides the means for connecting the handlebar 16 to the fork stem 17, see FIG. 4, of the front fork 17', see FIG. 1. Briefly, the shift mechanism operates the derailleurs through a pair of sheathed cables 18, 19, both extending from the shifter, one 18 to the front derailleur 11 and the other 19 to the rear derailleur 12.

Now for a detailed description of the shift mechanism. As seen from the drawings, the handlebar stem 14 at its lower end fits into the front wheel fork stem 17, at its upper end it provides an integral housing 21, and at the front of the housing 21 an integral handlebar clamp 22 is provided. The housing 21 has left and right side (when viewed from the standpoint of a rider seated on the bicycle) side walls 23, 24; see FIG. 6. The housing 21 or side walls 23, 24 are closed except at the bottom thereof and the front thereof below the clamp 22, see FIG. 4.

Figure 5:
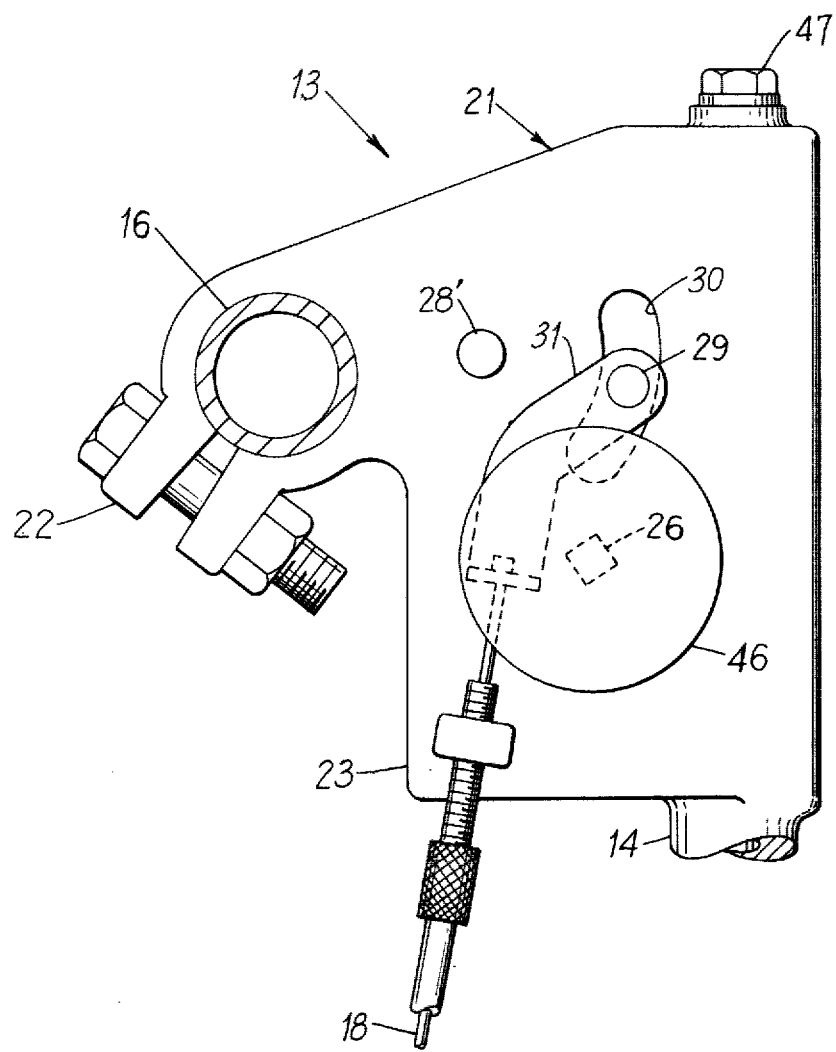
FIG. 5 is a left side view similar to that of FIG. 3.

The front and rear derailleur cables 18, 19 extend from the bottom of the shifter 13 at the left and right sides thereof respectively. Briefly, that part of the shift mechanism on the left side operates the front derailleur 11 and the part on the right side the rear derailleur 12. As in my prior patent, the front derailleur is operated by a ten-station cam 25 mounted on a square shaft 26, and a cam follower or roller 27 on the cam 25. The roller 27 is mounted on the rear end of a pivoted cam follower arm 28 which is pivoted on a shaft 28' in the side walls 23, 24. A shaft 29 for roller 27 extends out through a slot 30, see FIG. 5, in the left side 23 of the housing 21 to the upper end of a left side cable pull bar 31 for the front derailleur 11. Thus, all or most of the parts are inside the housing 21. However, whatever is exposed, that in turn as well as housing 21, are enclosed by a two-piece plastic cover having left and right side halves 33, 34, see FIG. 6. As in my prior patent, as the shaft 26 is rotated, so is the cam 25, and as the roller 27 follows the contour of the cam, the cable pull bar 31 is raised or dropped to pull or release the front derailleur cable 18 the proper amount. The square shaft 26 is journaled at its opposite ends in the housing side walls 23, 24.

Figure 3:
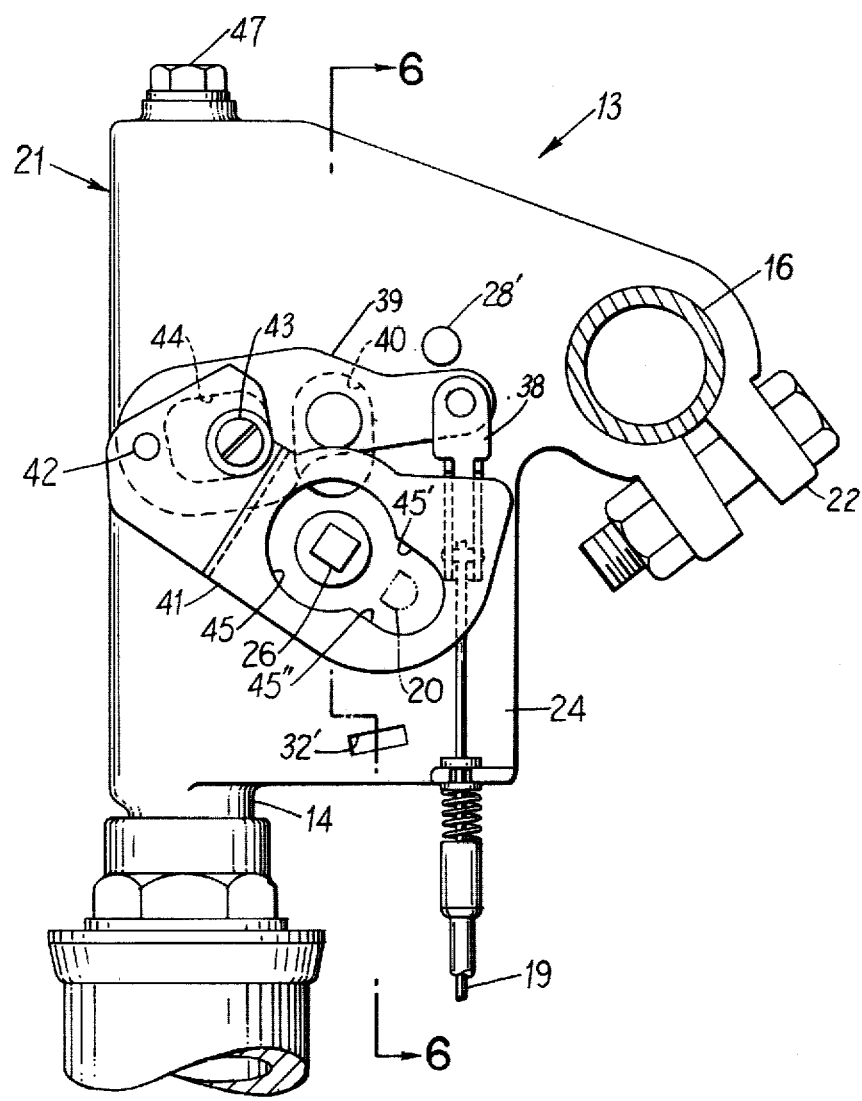
FIG. 3 is a broken away enlarged right side view of the shifter mechanism with outer plastic cover and handle removed.

The part of the shift mechanism for operating the rear derailleur 12 is somewhat different from that shown in my prior patent. Briefly, it has a cam 35 on the shaft 26, but instead of being open like the cam 25, it is closed. That is to say, instead of there being a single peripheral cam edge for the cam follower or roller 36 for the rear derailleur, the roller 36 actually operates on two cam edges 35', 35" provided by a cam groove 37 cut in the right side face of the cam. In other words, the roller 36 is captive in the groove 37 and rides on its inner and outer peripheral edges 35', 35" so that its corresponding cable pull bar 38, see FIG. 3, is actually pushed and pulled in positive fashion. The pull bar 38 is pivoted to the front end of a shift arm 39. Shift arm 39 is pivoted at its rear end, and the roller 36 is mounted at the central portion of the shift arm 39, the roller 36 extending through a slot 40 in the right side 24 of the housing into the cam groove 37.

The reasons for the difference in the two cams for the front and rear derailleurs respectively is that the front derailleur 11, which is conventional, is spring loaded to operate when the cable 18 is released, so all it needs is the single cam edge 25 to positively pull on the cable 18. However, the rear derailleur 12 is not spring loaded, but has a preselect detent mechanism which must be positively moved in either direction. This means that the two cam edges 35', 35" are needed for moving the cable 19 in either direction, and in addition the cable 19 must be stiff, whereas the cable 18 can be flexible. The rear derailleur is currently on the market under the name Positron II manufactured by Shimano of Osaka, Japan. The Positron II rear derailleur mechanism is described in detail in Shimano's U.S. Pat. No. 4,132,119 and comprises no part of my invention except in so far as my shift mechanism has been adapted to operate therewith to give the advantage of being able to shift the chain, or rather preselect the shift while the bicycle is not moving, and then when the bicycle is pedaled the Positron II derailleur will complete the preselected shift.

The two-way ratchet lever 15 will not be described in detail herein since it is well understood by those skilled in the art and already described in detail in my prior patent. However, it is provided with a plastic handle 15' and cup cover 15" to match up with the rest of the two-piece plastic cover 33, 34. In addition, means is provided to take up any slack or play in the parts so that the cable 19 is taut when the cam 35 starts to move the roller 36. This means comprises a slack take-up arm 41 which overlies the shift arm 39. Arm 41 is pivoted at two points. At its rear it is pivoted at 42 to the rear of shift arm 39, and it is also connected to the right side 24 of the housing at pivot 43. The shift arm 39 has a cutout 44 to clear the pivot 43, and the take-up arm 41 has a cutout 45 to clear the shaft 26. The front end of the cutout 45 in the arm 41 has two opposite stop edges 45', 45". These edges 45', 45" are engaged by a stop pin 20 on the ratchet lever 15 before the ratchet 15 actually starts to rotate the shaft 26. In other words, before the ratchet 15 will have turned the shaft 26 in either direction to cause the cam 35 to move the roller 36 and its corresponding shift arm 39 and cable pull bar 38, the roller 36 will be captive in the groove 37 and serve as a pivot point about which to rock the arm 39 in either direction to take up any play or slack in cable 19 or the various parts connected to opposite ends thereof. The arm 39 is rocked about the roller 36 by virtue of the fact that the stop 20 abuts the edges 45', 45" to move the take-up arm 41 about its pivot 43. As the arm 41 moves about pivot 43, it moves the shift arm 39 slightly up or down by virtue of the pivotal connection 42 between the rear ends of the two levers or arms 39, 41.

After the slack is taken up, if the stiff cable 19 is then positively moved in either direction, the amount of cable movement, as determined by the contour of the cam edges 35', 35" will be exactly correct for the previously alluded to preselect detent mechanism of the Shimano Positron II rear derailleur. Thus, with the combination of the Shimano Positron II rear derailleur with my positive push-pull cam means 35, 36 working on the stiff cable 19, together with means for taking up any slack or play in the parts, there is no likelihood of any undershifting or overshifting which might result in chain "jump off".

As in my prior patent, a finger 32 on the ratchet lever extends into a slot 32' in the right side wall 24, and the cams 25, 35 on square shaft 26 move in unison as the shaft is turned by the ratchet lever 15 one step or stage at a time, although this can be done successively quite rapidly.

In addition, it should be noted that should a knob be substituted for the ratchet lever, as in my prior patent, then the shifting can be very fast, and even so fast as to "jump" intermediate speed stages.

Figure 6:
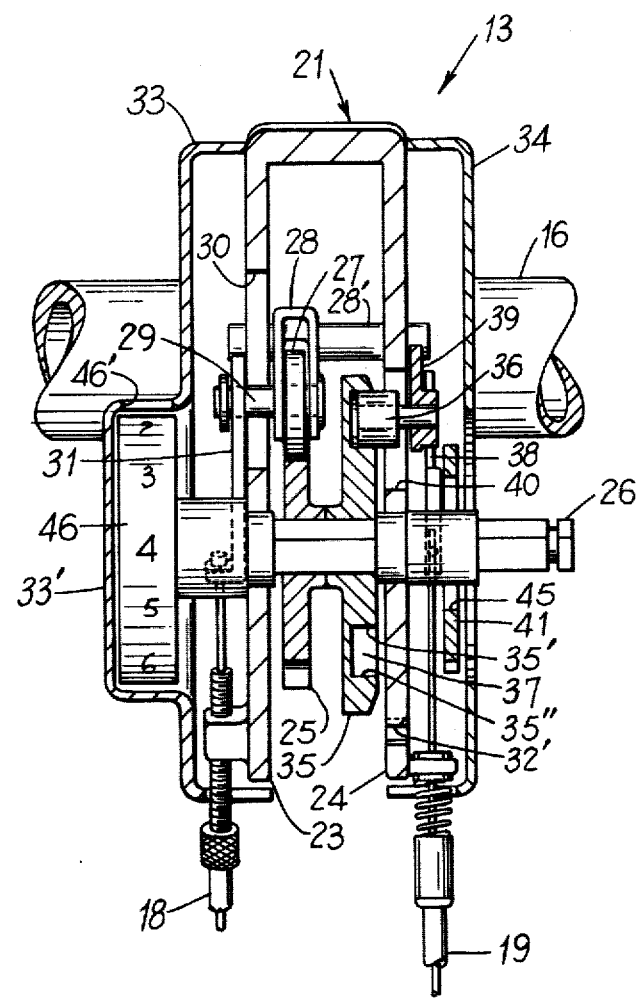
FIG. 6 is a cross-sectional view taken along the section line 6—6 of FIG. 3 and with the outer plastic cover in place.
Figure 7:
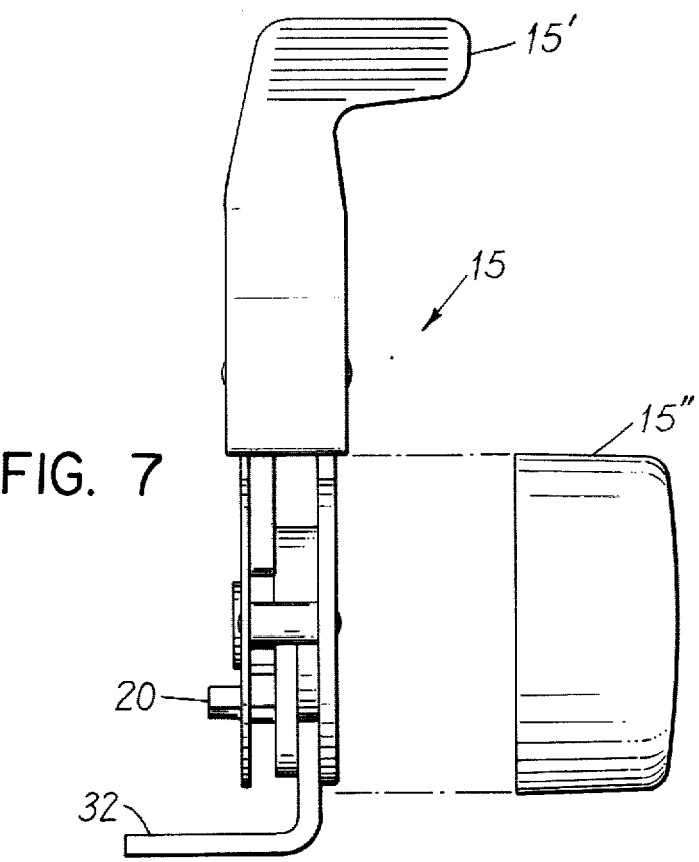
FIG. 7 is a rear view of the ratchet handle with its cover cup detached.
Figure 8:
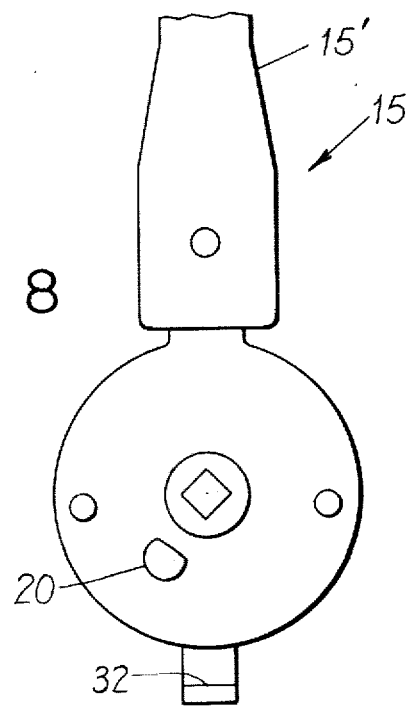
FIG. 8 is a view of the left side of the ratchet handle.

The lefthand end of the square shaft 26 has an indicator wheel 46, see FIG. 6, numbered 1 to 10 which also turns in unison with the cams 25, 35. The numbers are successively displayed through a window 46' in cover half 33, depending upon what speed or sprocket stage the rider is in and then next going to shift. Thus, there is an instantaneous read out of the condition of the bicycle, with no uncertainty, guesswork, or need to do any figuring. The window is formed in a circular integral cover portion 33' of the left side of the plastic housing. The indicator wheel is placed on the left side of the shifter so as not to be obscured from the rider's view when he has his right hand on the manual shift lever.

The integral parts of housing 21, handlebar clamp 22 and stem 14 can comprise a single piece aluminum or magnesium die casting, although other modes of fabrication could be used to make these parts into a single unitary member. As is conventional in the art, a long threaded stud 47 extends from the top of housing 21 down through its bottom stem portion which at its lower extremity is provided with a bevel 14'. A lug 48 also provided with a bevel 48' is threaded on the lower end of the stud 47 so that when its upper end is turned, the bevel 48' rides up on the bevel 14' to cause the lug 48 to become wedged in the front wheel fork stem 17 so as to affix the handlebar 16 to the front fork 17'.

It will now be seen that in addition to the advantages of my prior patent and the further advantages of the instant application, the device is still relatively low cost and very attractive from the standpoint of user acceptability. The shift mechanism besides being relatively pleasing to the eye from the standpoint of appearance is non-obtrusive and in an out-of-the-way yet relatively handy location from the standpoint of operator accessibility. Thus, it is up front where it can be reached easily, but still not in such a position as to be a snag for the rider's body or his clothing.

In one embodiment of the invention the two sprockets of the front set had 52 and 46 teeth, and the five sprockets of the rear set had 14, 17, 20, 24 and 30 teeth. The shift pattern was 14-52, 14-46, 17-52, 17-46, 20-52, 20-46, 24-52, 24-46, 30-52, 30-46. Thus, it will be clear therefrom to those skilled in the art that the progressive transition through the ten stages requires no "skipover" of the chain at the rear set of sprockets, which is not possible with conventional shifters. In addition, conventional shifters require the operation of two levers and further provide no readout of what stage the rider is in or going into.

I claim:

1. In a multiple-speed bicycle having a derailleur mechanism and a manually actuated control mechanism for operating said derailleur mechanism, said bicycle having a front wheel fork having an upper stem, and a handlebar stem positioned inside and clamped to said fork stem, the improvement of said manually actuated control mechanism being positioned inside said handlebar stem above said fork stem, said improvement comprising a housing formed on said handlebar stem above said fork stem, said housing being relatively flat in the fore and aft direction of said bicycle and being positioned to protrude ahead of said fork stem, a handlebar clamp formed on the front of said housing for clamping a handlebar to said handlebar stem, said manually actuated control mechanism being positioned inside said housing, and said handlebar stem, housing and clamp being integrally formed with each other as a unitary single piece member.

2. In a 10-speed bicycle having front and rear derailleur mechanisms and a single manual control mechanism operable by a single manual hand member to operate said two derailleur mechanisms in unison, said control mechanism comprising a pair of cams operated in unison by said hand member and a pair of cam follower arms connected by a pair of cables to different ones of said derailleur mechanisms, the cable to the rear derailleur mechanism being stiff to alternately push and pull on the same upon movement of said hand member in opposite directions, a slack take-up mechanism for said rear derailleur cable and the parts connected to opposite ends thereof, said slack take-up mechanism comprising a lever pivoted to the cam follower arm having the stiff cable connected thereto, and means on said hand member operable on said lever to first move said rear derailleur cam follower arm to take up said slack and then to rotate the cam corresponding thereto.

* * * * *